United States Patent [19]
Wong et al.

[11] Patent Number: 5,138,178
[45] Date of Patent: Aug. 11, 1992

[54] PHOTOELECTRIC PAPER BASIS WEIGHT SENSOR

[75] Inventors: Lam F. Wong, Fairport; Stephen C. Arnone, Rochester; Jacob N. Kluger, Rochester; David M. Attridge, Rochester; Lisbeth S. Quesnel, Pittsford; Paul J. Degruchy, Hilton, all of N.Y.

[73] Assignee: Xerox Corporation, Stamford, Conn.

[21] Appl. No.: 627,867

[22] Filed: Dec. 17, 1990

[51] Int. Cl.$^5$ .............................................. G01N 21/86
[52] U.S. Cl. ..................................... 250/559; 356/429
[58] Field of Search ................... 250/223 R, 559, 571, 250/561; 356/429

[56] References Cited

U.S. PATENT DOCUMENTS

| | | | |
|---|---|---|---|
| 4,151,410 | 4/1979 | McMillan et al. | 250/223 R |
| 4,550,252 | 10/1985 | Tee | 250/223 R |
| 4,670,647 | 6/1987 | Hubble, III et al. | 250/214 AG |
| 4,937,460 | 6/1990 | Duncan et al. | 250/561 |
| 5,071,514 | 12/1991 | Francis | 356/429 |

OTHER PUBLICATIONS

Xerox Disclosure Journal vol. 7, #4, p. 229, Aug. 1982.

Primary Examiner—David C. Nelms
Assistant Examiner—Que T. Le
Attorney, Agent, or Firm—Oliff & Berridge

[57] ABSTRACT

A non-contact, transmissive energy sensor is utilized for determining the thickness of paper sheets in a feed path. The sensor includes an energy emitting source and an energy detector, the output of the energy detecting source being proportional to the amount of energy received by the energy detector. The signal output level of the detector is utilized in a model to determine the basis weight of paper in the detecting zone of the detector. Heuristic sampling techniques can be utilized to reduce or eliminate the effects of images printed on the paper and flutter of the paper as it moves. An automatic calibration routine utilizing boundary coefficients is used to calibrate the paper basis weight detection system. The paper basis weight determination is utilized to control subsequent operations to which the paper sheet is subjected in order to optimize image quality and sheet handling, and to control finishing operations.

19 Claims, 2 Drawing Sheets

1

PHOTOELECTRIC PAPER BASIS WEIGHT SENSOR

FIELD OF THE INVENTION

This invention relates to the detection of the basis weight of sheets traveling in a feed path and to the control of operations performed on the sheets in accordance with the detected basis weight. The invention more particularly relates to non-contact, on line sensors for precisely determining sheet basis weight.

BACKGROUND OF THE INVENTION

Sheet basis weight detection in apparatus which perform operations on sheets, such as printers and image reproduction equipment, is desirable because it allows the range of paper weights processed by the apparatus to be increased. The quality of the output of basis weight-sensitive work stations can be maintained by adjusting processing parameters in accordance with the basis weight of the sheet being processed. Such basis weight determination, which bears a linear correlation to sheet thickness, and consequent adjustment can also increase the life of machine components and reduce machine down time resulting from jamming of improperly fed sheets.

Optical sensors for detecting sheets fed along a feed path to be processed in a plurality of work stations are known. Such sensors are shown, for example, in U.S. Pat. No. 4,670,647 to Hubble et al, owned by the assignee of the present application. In such systems, an analog sensor comprising a light emitting diode (LED) and a phototransistor is used in ON/OFF digital fashion by coupling the output of the phototransistor to a threshold device, such as a Schmitt trigger. In this configuration, the sensor is utilized for detecting the presence of a sheet at a particular point in the feed path to provide timing and control signals for subsequent sheet handling. In addition, the sensors can be used as jam detectors to detect the presence of a non-moving sheet in the feed path. Under jam conditions, the output signal of the sensor is used to terminate downstream operations until the jam is cleared. However, this system does not detect the basis weight or the thickness of the paper.

A variation of the foregoing arrangement is described in U.S. Pat. No. 4,151,410 to MacMillan et al. This arrangement senses rapidly fluctuating output levels of the phototransistor brought about by variable translucency of the fed sheet to indicate proper movement of the sheet. When the rapid fluctuations stop or when there is a rapid drop in sensor output which results from double feeding of the sheet, a signal indicative of a paper jam is given by the electronic detection system. However, this arrangement does not include the capability of determining a thickness or basis weight of the sheet from the sensor signal.

Another method for determining thickness of thin sheets is shown in U.S. Pat. No. 4,937,460. However, systems of this type rely on contact of the sheet by a receiver or similar element to provide a variable analog signal indicative of paper thickness. However, such systems have the disadvantage of requiring an element to engage the sheet and such engagement introduces the chance for the detecting system itself to influence the detected sheet thickness. Further, such arrangements require additional hardware for carrying out the thickness measuring operation. This adds to the cost, complexity and size requirements for equipment employing such thickness detection apparatus.

SUMMARY OF THE INVENTION

It is an object of the invention to provide a non-contact sensor for accurately sensing sheet basis weight.

It is a further object of the invention to utilize the sensing of sheet basis weight to control subsequent operations which the sheet undergoes.

It is a further object of the invention to provide accurate sheet basis weight measurement with a minimum of additional hardware.

These and other objects of the invention are achieved by utilizing a transmissive detector, the output of which varies as a function of the sheet thickness or basis weight of the paper. Paper basis weight categories are determined in accordance with an idealized model to represent the sensor analog output as a continuous function of the paper basis weight or thickness. Suitable sampling and filtering techniques are employed so that the effects of printing and paper flutter can be eliminated. To compensate for environmental and aging conditions, such as contamination, temperature fluctuation and component degradation, calibration utilizing correction factors determined under boundary conditions is performed to maintain the accuracy of the detector.

DESCRIPTION OF THE PREFERRED EMBODIMENT

The sheet basis weight determination system of the present invention can be utilized in a variety of types of equipment which perform operations on conventional paper sheets which are energy transmissive. For purposes of illustration, the invention is described in the context of electrophotographic printing or reproduction equipment for forming images on paper.

Figure 1:
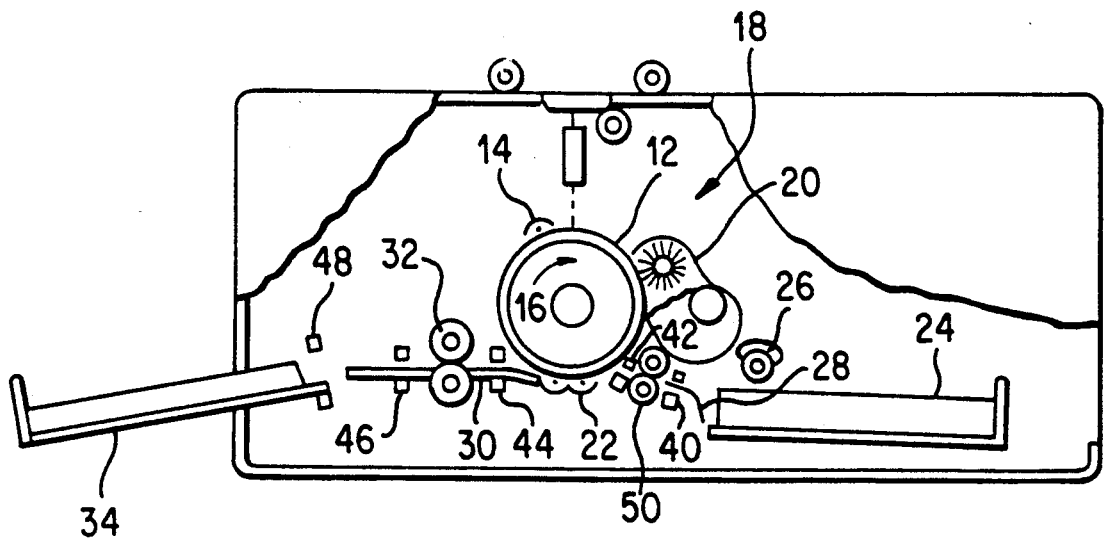
FIG. 1 is an elevational view of a reproduction machine in which the present invention can be utilized.

With reference to FIG. 1, there is illustrated an electrophotographic printing machine having a photoconductive surface 12 movable in the direction of arrow 16 to advance the photoconductive surface sequentially through various processing stations. At a charging station, a corona generating device 14 electrically connected to a high voltage power supply charges the photoconductive surface 12 to a relatively high, substantially uniform potential. Next, the charged portion of the photoconductive surface 12 is advanced through exposure station 18. At exposure station 18, an original document is positioned on a transparent platen. Lamps illuminate the original document and light rays reflected from the original document are transmitted onto photoconductive surface 12. A magnetic brush development system 20 advances a developer material into contact with the electrostatic latent image on surface 12.

At transfer station 22, a sheet of paper is moved into contact with the toner powder image. The paper sheet 24 is advanced to the transfer station by sheet feeding apparatus 26 contacting the uppermost sheet of the stack. Sheet feeding apparatus 26 rotates so as to advance sheets from the stack onto transport 28. The transport 28 directs the advancing sheet of paper into contact with the photoconductive surface 12 in timed sequence in order that the toner powder image developed thereon contacts the advancing sheet of paper at the transfer station. Transfer station 22 includes a corona generating device for spraying ions onto the underside of the sheet. This attracts the toner image powder from the photoconductor surface 12 to the sheet.

After transfer, the paper sheet 24 continues to move onto conveyor 30 advancing the paper sheet to fusing station 32. Fusing station 32 generally includes a heated fuser roller and a backup roller for permanently affixing the transferred powder image to sheet 24. After fusing, paper 24 is advanced to a catch tray 34 for removal by the operator.

The printer includes several transmissive paper sensors. In particular, sensor 40 is positioned at the sheet feeding apparatus 26; sensor 42 is disposed just above the transfer station 22; sensor 44 is disposed after the transfer station, between the fuser 32 and transfer station 22, and sensor 46 is disposed after the fuser station 32. The sensors are utilized to detect the presence of a sheet of paper 24 at various positions along the paper feed path through the machine for purposes of timing the operation of elements of the machine, such as the drum carrying the photoconductive surface 12, the corona generating device at the transfer station 22, the rollers at the fusing station 32 and various feed rollers, such as feed rollers 50, for feeding the paper sheet 24 along the feed path.

Figure 2:
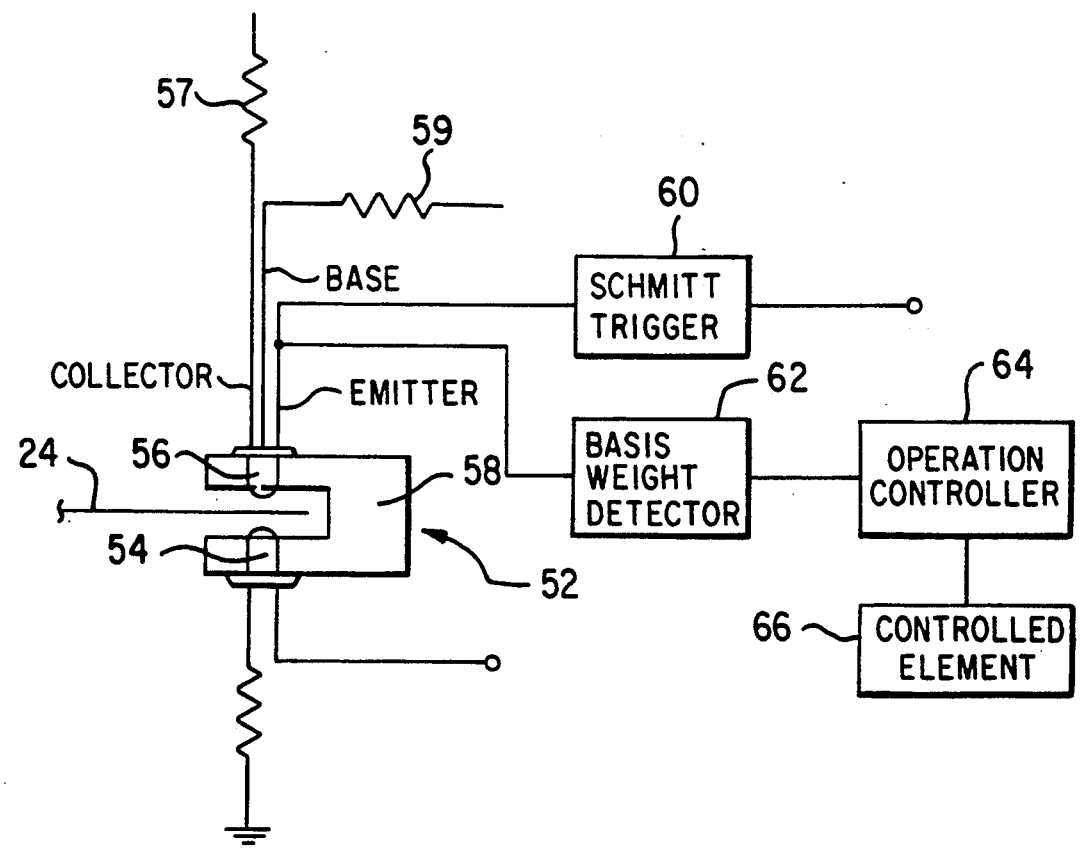
FIG. 2 is a schematic representation of a transmissive paper path sensor embodying the present invention.

FIG. 2 shows a typical transmissive paper sheet sensor 52 of the type just described, modified for purposes of the invention. The sensor 52 includes a source for emitting electromagnetic energy or light, such as LED 54. A phototransistor 56 is disposed opposite the LED 54 in a position to receive energy from LED 54. The LED 54 and phototransistor 56 are mounted on opposed legs of the U-shaped detector body 58. The opposed legs of the U-shaped body 58 define between them a detection zone through which an edge of a paper sheet 24 passes as it travels along the feed path.

FIG. 2 shows a typical arrangement for such a transmissive sensor wherein the electrical signal from the phototransistor 56 is provided as an input to a Schmitt trigger 60 or any other suitable threshold device. The output signal of the Schmitt trigger, depending upon the input voltage applied to it, indicates the absence or presence of sheet 24 at the sensor location. As is customary with sensors of this type, in order to eliminate interference from stray light sources and to improve the signal to noise ratio, sensor 52 is equipped with optical filters (not shown) to block visible light and pass only infrared wave lengths issuing from LED 54. Typically the infrared LED used for this purpose produces invisible light in the near IR region of 805-1000 nanometers wave length. The amount of light produced by the LED is substantially proportional to the amount of current supplied.

As previously noted, the sensor 52 and associated circuitry is generally of a type which heretofore has been used for enabling the sensor to provide timing and jam detection capabilities. Normally, in detection systems of this type, the phototransistor 56 is provided with a base bias resistor having a relatively small value, to make the phototransistor behave like a digital ON/OFF device rather than a linear analog device. The smaller the base bias resistor value, the higher the LED intensity required to switch on the phototransistor (i.e., to conduct a relatively large amount of current). The use of a low value base bias resistor in the phototransistor appears to give a perceived faster response time for normal ON/OFF paper sensing because of the threshold effect. However, for purposes of the present invention, the base bias resistor 59 should have a relatively high value (over a few hundred kilo ohms) or should be eliminated altogether. The elimination of or the use of a high value base bias resistor results in the phototransistor 56 giving a proportional output signal over a wide range of incident energy levels. As a result, the output of the phototransistor is a continuous signal that is substantially directly proportional to the amount of energy detected by the phototransistor. Since the amount of IR energy which is transmitted through the paper is proportional to the basis weight of the paper, the output of the phototransistor can be correlated to a basis weight value of a sheet 24 positioned in the detection zone of the sensor 52. The thickness of the sheet is directly proportional to its basis weight, assuming compositional similarity.

The collector resistor in a typical sensor arrangement serves as a pullup resistor to supply power to the phototransistor and as a current limiting resistor. For purposes of basis weight detection, impedance matching between the phototransistor and the collector resistor 57 is important so that the analog output voltage can have the widest possible range for determining a range of basis weights of paper. As the impedance of most phototransistors is quite high, it is useful to use the largest possible collector resistor. The countervailing consideration in determining the collector resistor value is the susceptibility of the system to noise interference because of the weak signal resulting from a low current value.

Referring again to FIG. 2, the output signal provided by the emitter of phototransistor 56 is provided to a threshold device such as Schmitt trigger 60 which gives a signal indicative of the presence or absence of a sheet 24 at the detector, in a known manner. The analog output signal of phototransistor 56 is also provided to basis weight detector 62 for determining the basis weight of the paper sheet 24 positioned in the deteotion zone of the deteotor 52. The basis weight detector 62 can comprise a microcomputer including a CPU, a ROM and a RAM. Ideally, the detector 62 can be implemented in a general purpose microprocessor, which are typically used for controlling machine operations in electrophotographic reproduction machines, facsimile machines, printers and the like. Readings from the output signal of the phototransistor 56 can be stored in a RAM and a basis weight value can be derived in the CPU on the basis of an appropriate model stored in the ROM. An appropriate basis weight detection routine will be described hereinafter in greater detail.

The output of the basis weight detector 62 can be utilized by an operation controller 64 for controlling processing operations on the sheet 24 on the basis of the detected thickness or weight. For example, the bias level provided to the corona generating device of the transfer station 22 can be controlled on the basis of paper weight detection by means of a suitable control algorithm implemented by a microprocessor in the operation controller 64. The design of a suitable controller arrangement and the appropriate programming thereof are influenced by the operation being controlled and can be determined by one of ordinary skill in this art based upon the provided verbal functional descriptions. Therefore, no further detailed description of hardware or software is necessary in order for one of ordinary skill in the art to practice the present invention without undue experimentation. The output of operation controller 64 is provided to the controlled element 66 to vary the operating parameter being controlled. In this regard, the reference to the transfer station 22 is illustrative only, and it should be realized that other operations in a typical electrophotographic reproduction machine, and other types of machines processing paper sheets, can be controlled. For example, illumination control can be effected to improve copy quality by reducing or eliminating show-through resulting from high illumination levels and transfer systems along the sheet path can be adjusted in accordance with sheet thickness. Image fusing can be improved by adjusting dwell time or temperature to paper thickness. Registration accuracy and reliability, for example in cross roll transfer systems, can be improved. Paper basis weight determination can also improve finishing capabilities, such as stapling and book binding, which are influenced by sheet thickness. Job operability by predetermination of existing paper supply for job completion can also be effected.

It is evident from the foregoing description that the basis weight detection arrangement of the present invention can be implemented with a minimum of additional elements. It utilizes, in substantial part, the transmissive sheet detectors which are commonly used. The signal processor, requirements can be accommodated in existing control microprocessors. Operation control capabilities can be effected in the same manner.

Figure 3:
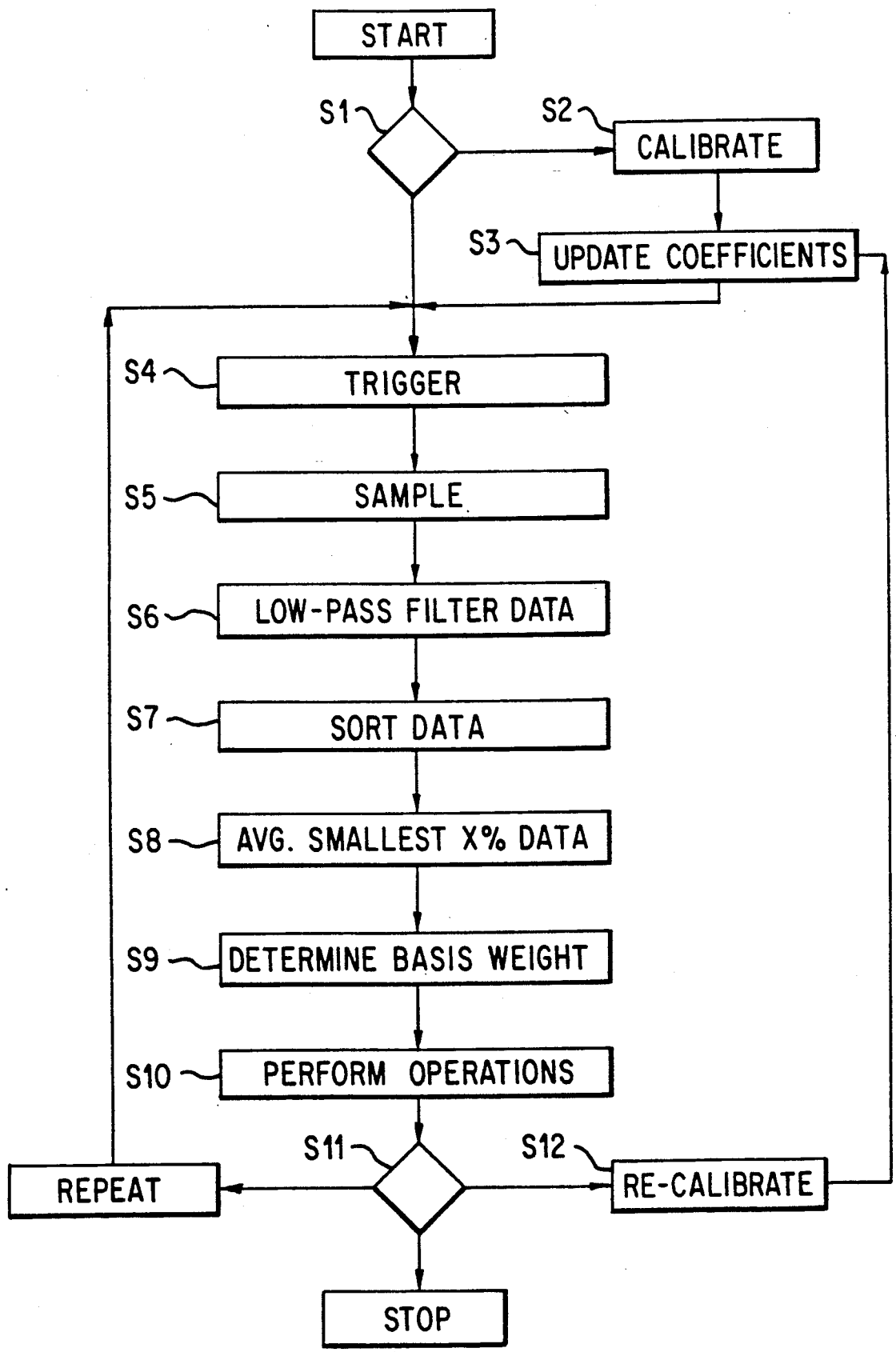
FIG. 3 is a flow diagram of a control system for determining paper basis weight in accordance with the present invention.

Referring to FIG. 3, there is shown a flow diagram illustrating a routine for making basis weight determinations and controlling machine operations in response to such determinations. As previously noted, the routine can be implemented by a general purpose microcomputer. For purposes of description, it will be assumed that a suitable model for correlating paper basis weight to the output signal level of phototransistor 56 has been entered and stored in the microprocessor. A model which has been used with good results is the following:

$$V = \frac{a_1 \rho + a_2}{a_3 \rho + 1} \quad \text{(Equation 1)}$$

where V is the analog voltage output of phototransistor 56, $\rho$ is a value representing the basis weight of a sheet and $a_1$, $a_2$ and $a_3$ are constants. By empirical methods involving actual measurement of several different basis weight sheets and measurement of the phototransistor output signal the constants $a_1$, $a_2$ and $a_3$ can be determined by mathematical means, such as least means squares or three point fitting of curves. Ideally, the model is stored in the ROM of the implementing microprocessor to enable automatic determinations of paper basis weight by the microprocessor.

At step (hereafter identified as S) 1, an initial determination is made after the start of the routine whether the ideal model for determining basis weight has been calibrated to the particular machine. If not, the routine goes to S2 to determine calibration values for modifying the constants $a_1$, $a_2$ and $a_3$ of the model. Such calibration is necessary because of the differences in the output characteristics of sensors 52 resulting from differences in design criteria and deterioration resulting from contamination and aging. Calibration can be effected by determining constants of the basis weight determination model at the boundaries of sensor operation. That is, the level of the output signal of phototransistor 56 is determined at 0 basis weight—i.e., with no paper in the sensor, in a first sequence, and at infinite basis weight —with LED 54 turned off, in a second sequence. Equation 1 can then be utilized to determine a set of boundary constants. Equation 1 can be rewritten as follows:

$$V = \frac{(a_1/a_3)\rho}{\rho + 1/a_3} + \frac{a_2}{a_3\rho + 1} \quad \text{(Equation 2)}$$

The boundary constants $B_0$ and $B_\infty$ are defined such that:
$B_0$ is the difference between the measured and calculated values at 0 basis weight;
at $\rho = 0$; $V(0) = a_2$. $B_0 = V_0 - a_2$.
$B_\infty$ is the difference between the measured and the calculated values at infinite basis weight;
at $\rho = \infty$, $V(\infty) = a_1/a_3 \to B_\infty = V_\infty - a_1/a_3$.
For calibration purposes, the equivalent model becomes:

$$V = \frac{(V_\infty - B_\infty)\rho}{\rho + 1/a_3} + \frac{V_0 - B_0}{a_3\rho + 1} \quad \text{(Equation 3)}$$

Automatic calibration can be performed by periodic measurement of the two boundary outputs $V_0$ and $V_\infty$ to effectively scale the output according to environmental changes. The results of the calibration determined in S2 are used to update the constants or coefficients of the model in S3.

Upon a determination at S1 that no calibration is necessary or upon completion of the update of coefficients at S3, the routine goes to S4 wherein it is determined (on the basis of output of Schmitt trigger 60) if a paper sheet 24 is present in the detector 52. If the determination at S4 is affirmative, the routine moves to S5 wherein a plurality of sample readings of the output of phototransistor 56 are taken. If it is likely that the output signal of phototransistor 56 will include a significant amount of noise, the sample values taken in S5 are processed in the low pass filter at S6 to remove noise. Sample readings are then sorted and temporarily stored in step S7.

The routine then goes to step S8, the object of which is to discriminate a single output level to be used for the basis weight calculation. This can be accomplished by suitable signal processing techniques. A technique which has been found particularly useful is heuristic discrimination because it filters out variations resulting from images on the paper and flutter of the paper as it travels in the detection zone of the sensor 52. Imaging media applied to the surface of the paper and flutter of the paper change the amount of energy reaching the phototransistor 56 from the LED 54 and can influence the level of the output signal of phototransistor 56. The heuristic discrimination is made by taking the average of the smallest few percent of the stored signal samples to determine a signal output level representative of the basis weight of the paper. At S9 a determination of the basis weight of sheet 24 sensed by sensor 52 is made, utilizing the model represented by Equation 1 with updated coefficients calibrated to the existing conditions of sensor 52. To do so, a suitable calculation routine is programmed into the microprocessor by known techniques. The output which results at S9 is utilized in S10 to control one or more subsequent operations performed on the sheet 24. At S11, a determination is made whether the routine should be stopped, the measurement routine repeated, or if an automatic recalibration should be undertaken, as at S12. The routine normally operates in a repeat mode and recalibration can be effected on a periodic or time-dependent basis. A STOP usually occurs under service conditions when, for example, it is desirable to decouple the basis weight determination system from other parts of the apparatus to perform service functions. At S12, the recalibration routine takes place and the results of the recalibration are utilized in S3 to update the coefficients of the basis weight determination model.

The advantages of the disclosed invention are manifold. The basis weight of paper is determined practically and accurately. Measurement is done without contact with the paper, as it travels, and in real time. Basis weight can be determined very quickly, usually in less than an inch of paper travel. The system is flutter and image insensitive. Measurement accuracy is maintained over the machine life by an automatic calibration system. The cost of the system is minimized by the fact that the system can be implemented with sensors and microprocessors which are already existing components of many machine designs.

We claim:

1. Apparatus for determining the basis weight of a sheet comprising:
    means for emitting electromagnetic energy;
    means for detecting electromagnetic energy emitted by the emitting means and for providing an output signal proportional to the amount of energy from the energy emitting means received by said detecting means;
    mounting means for mounting the energy emitting means and the energy detecting means to define a detection zone therebetween;
    means for positioning the sheet in said detection zone, whereby energy emitted by the energy emitting means impinges on the sheet and is detected by the energy detecting means;
    means for calibrating the output signal of the energy detecting means; and
    means for determining the basis weight of the sheet positioned in said detector zone from the output signal of the energy detecting means.

2. Apparatus as in claim 1, wherein the mounting means includes means for mounting the energy emitting means and the energy detecting means in opposed relationship on opposite sides of said detection zone.

3. Apparatus as in claim 2, wherein the basis weight determining means includes means for determining the basis weight of the sheet according to the following:

$$V = \frac{a_1\rho + a_2}{a_3\rho + 1}$$

wherein V is a voltage level of the energy detecting means when a sheet is detected, $a_1$, $a_2$, and $a_3$ are constants and $\rho$ is a value representative of the basis weight of the sheet.

4. Apparatus as in claim 3, wherein the calibrating means includes means for setting $a_1$, $a_2$, and $a_3$.

5. Apparatus as in claim 4, wherein the setting means comprise:

first means for finding $a_2$ at a boundary condition representing the absence in the detecting zone of a sheet for intercepting energy from the energy emitting means; and
second means for finding the ratio of $a_1$ to $a_3$ at a boundary condition representing the absence of energy from the energy emitting means received by the energy detecting means.

6. Apparatus as in claim 1, wherein the means for determining the basis weight of the sheet comprises:
    means for taking a plurality of readings of the output signal from the energy detecting means as the sheet moves in said detection zone; and
    means for heuristically discriminating from the plurality of readings a single output level corresponding to the basis weight of the sheet.

7. Apparatus for performing an operation on energy transmissive sheets comprising:
    means for defining a feed path for movement of the sheets;
    a sheet working station along the feed path, the working station including means for varying a processing parameter to which the sheet is subjected at said working station;
    a sensor adjacent the feed path for defining a detection zone for said sheets, said sensor including energy emitting means for emitting energy into the detection zone and energy detecting means for giving an output signal related to the amount of energy from the emitting means passing through the detection zone to the detecting means;
    means responsive to the energy detecting means for determining the basis weight of a sheet in said detection zone; and
    means for generating a control signal to control said means for varying a processing parameter, in response to a sheet basis weight determination by said basis weight determining means.

8. Apparatus as in claim 7, further comprising:
    calibration means for calibrating said basis weight detecting means.

9. Apparatus as in claim 8, wherein the calibration means includes means for undertaking a first sequence for deriving a first calibration value when the energy emitting means is on and a sheet is absent from the detection zone; and means for turning the energy emitting means off and undertaking a second sequence for deriving a second calibration value with said energy emitting means off.

10. Apparatus as in claim 7, wherein the sheet basis weight determining means includes means for making a basis weight determination according to the following:

$$V = \frac{a_1\rho + a_2}{a_3\rho + 1}$$

wherein V is a voltage level of the output signal of said energy detecting means; $a_1$, $a_2$, and $a_3$ are constants; and $\rho$ is a value representative of the basis weight of a detected sheet.

11. Apparatus as in claim 10, and further comprising:
    calibration means for calibrating said basis weight determining means;
    said calibration means including means for deriving constant $a_2$ and the ratio of constant $a_1$ to constant $a_3$.

12. Imaging apparatus for forming images on energy transmissive sheets comprising:
   a work station for performing an operation on said sheet, said work station including means for varying at least one operating parameter in accordance with the basis weight of a sheet undergoing said operation at said work station;
   a detector positioned along the feed path and defining a detection zone in the feed path for detecting sheets in the feed path, the detector including an energy emitting means for emitting energy into the detection zone and an energy detecting means for receiving energy transmitted through the detecting zone from the energy emitting means and for giving an output signal related to the amount of energy received by the energy detecting means;
   determining means for determining the basis weight of sheets in the feed path in response to the output signal from the energy deteoting means; and
   means for varying said at least one operating parameter in response to a basis weight determination made by said determining means.

13. Apparatus as in claim 12, and further comprising: calibrating means for calibrating the basis weight determining means.

14. Apparatus as in claim 13, wherein the calibrating means comprises:
   means for effecting first and second calibration sequences, the first calibration sequence being effected when the energy emitting means is on and the detection zone is clear and the second calibration sequence being effected with the energy emitting means off and the energy detecting means on.

15. Apparatus as in claim 14, wherein the basis weight determining means includes means for deriving a sheet basis weight according to the following:

$$V = \frac{a_1 \rho + a_2}{a_3 \rho + 1}$$

wherein V is an output level of the energy detecting means while a sheet is in the detection zone; $a_1$, $a_2$, and $a_3$ are constants; and $\rho$ is a value representative of the basis weight of a sheet in the detection zone.

16. Apparatus as in claim 15, wherein the basis weight detecting means includes means for taking a plurality of readings of the output signal of the detector, and means for deducing a single output level of the energy detecting means corresponding to the basis weight of the sheet from said plurality of readings.

17. Apparatus as in claim 15, wherein the calibration means includes means for deriving constant $a_1$ and the ratio of constant $a_1$ to constant $a_3$.

18. Apparatus as in claim 12, wherein the energy emitting means emits infrared energy.

19. Apparatus as in claim 18, wherein the infrared energy is of a wavelength between 850 to 1000 nanometers.

* * * * *